Aug. 15, 1939.　　　M. E. LANGE　　　2,169,765
MACHINE TOOL
Filed Oct. 11, 1935　　　9 Sheets-Sheet 1
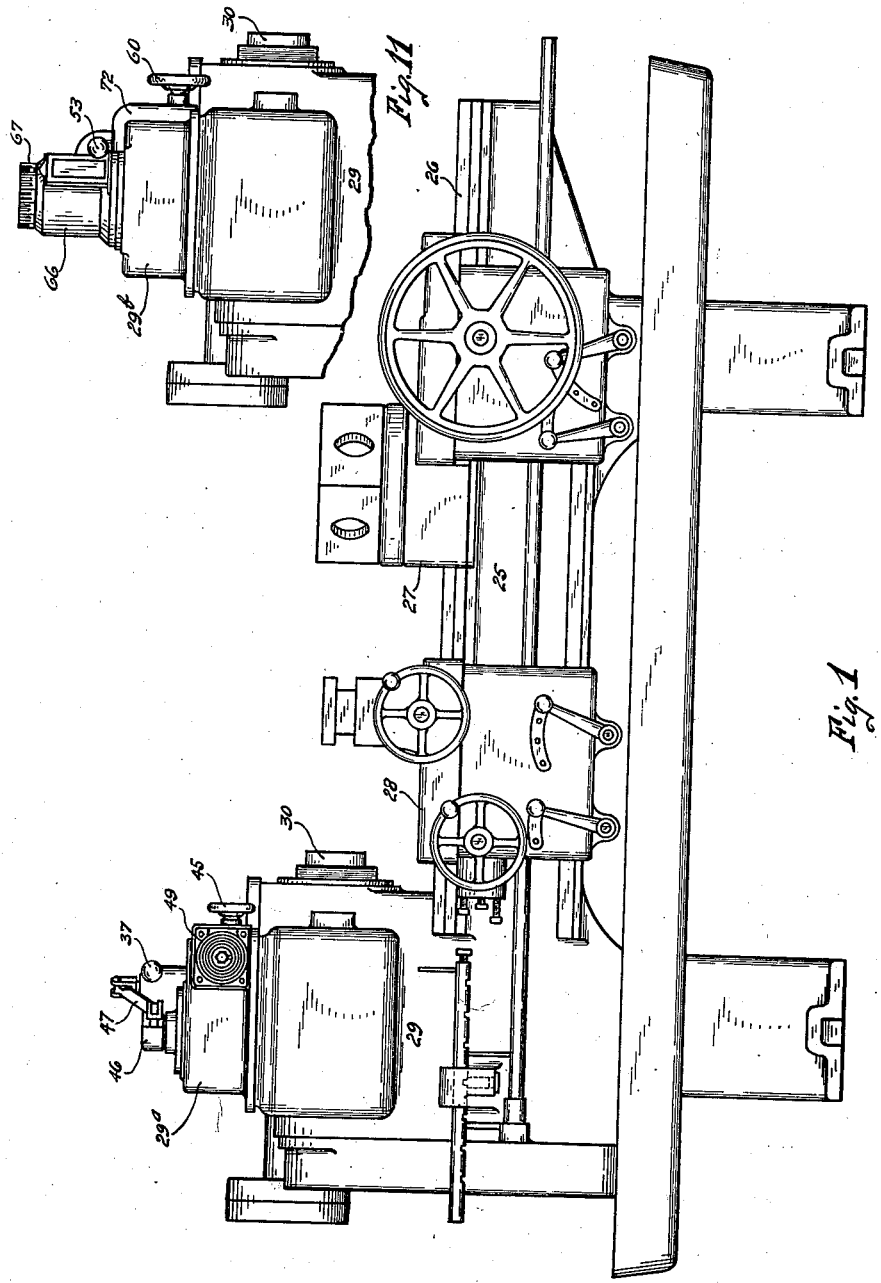
INVENTOR.
BY　MAX E. LANGE
　　Kwis, Hudson & Kent
　　　　ATTORNEYS.

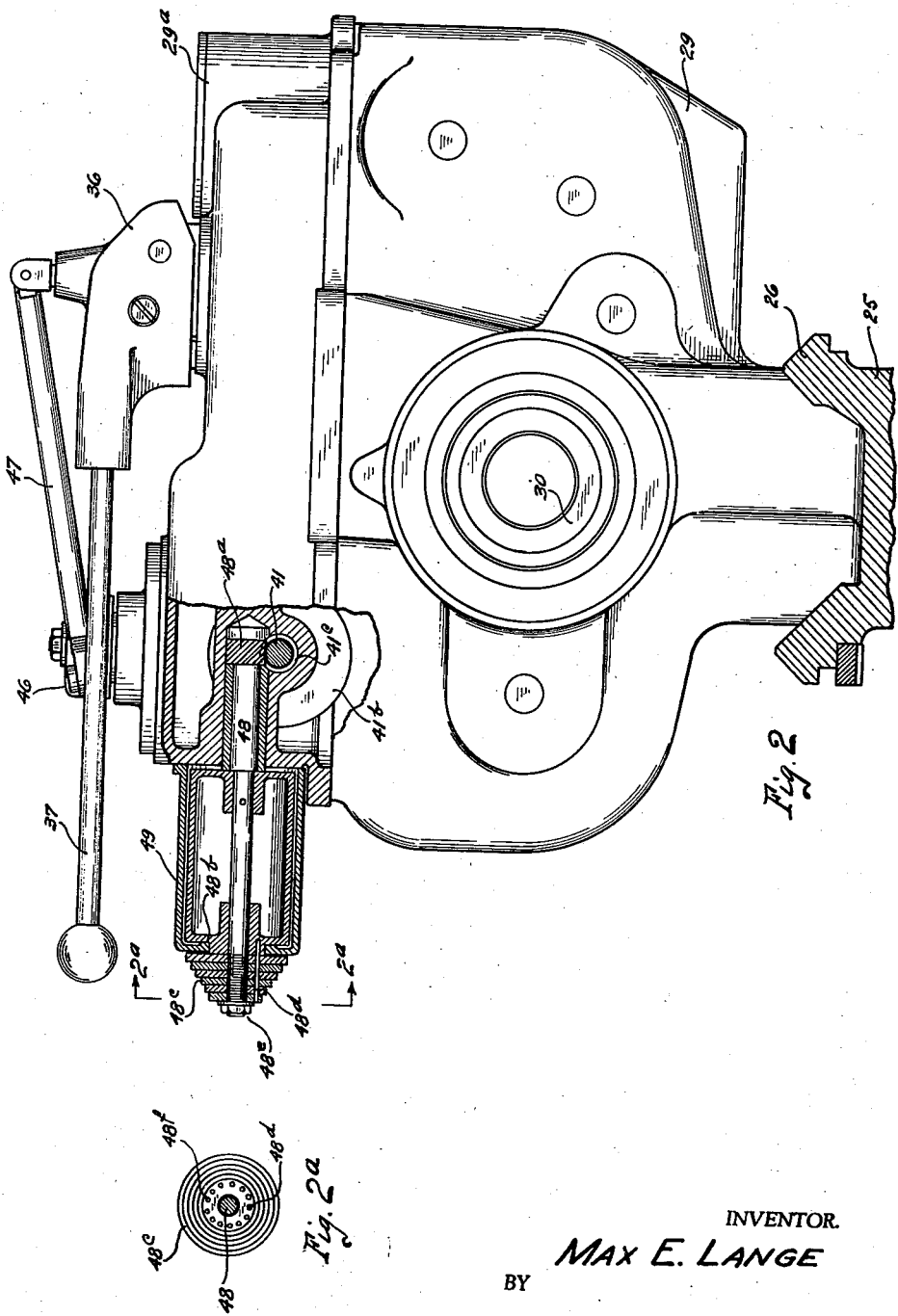

Aug. 15, 1939.    M. E. LANGE    2,169,765
MACHINE TOOL
Filed Oct. 11, 1935    9 Sheets-Sheet 3
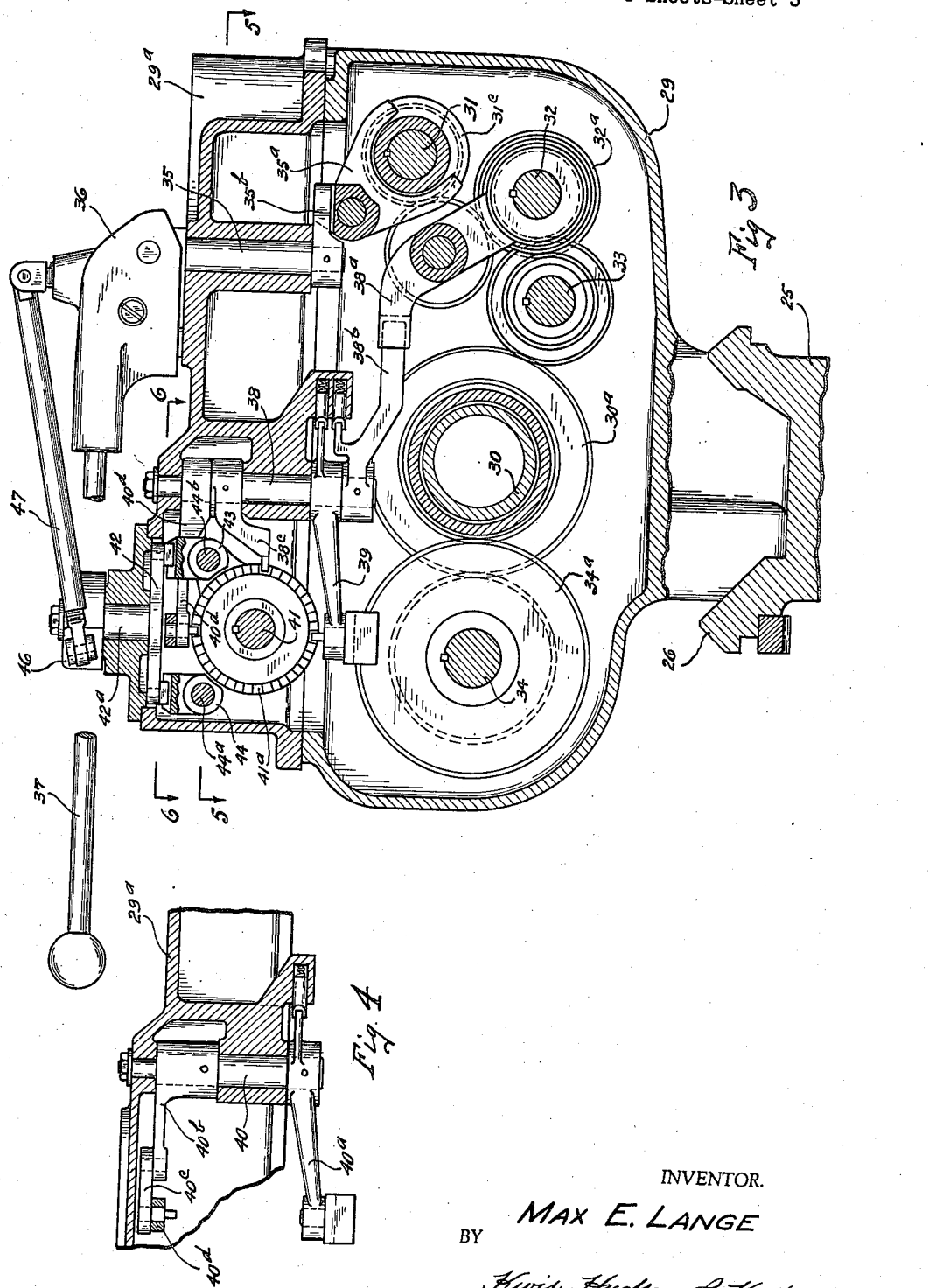
INVENTOR.
Max E. Lange
BY
Kwis, Hudson & Kent
ATTORNEYS

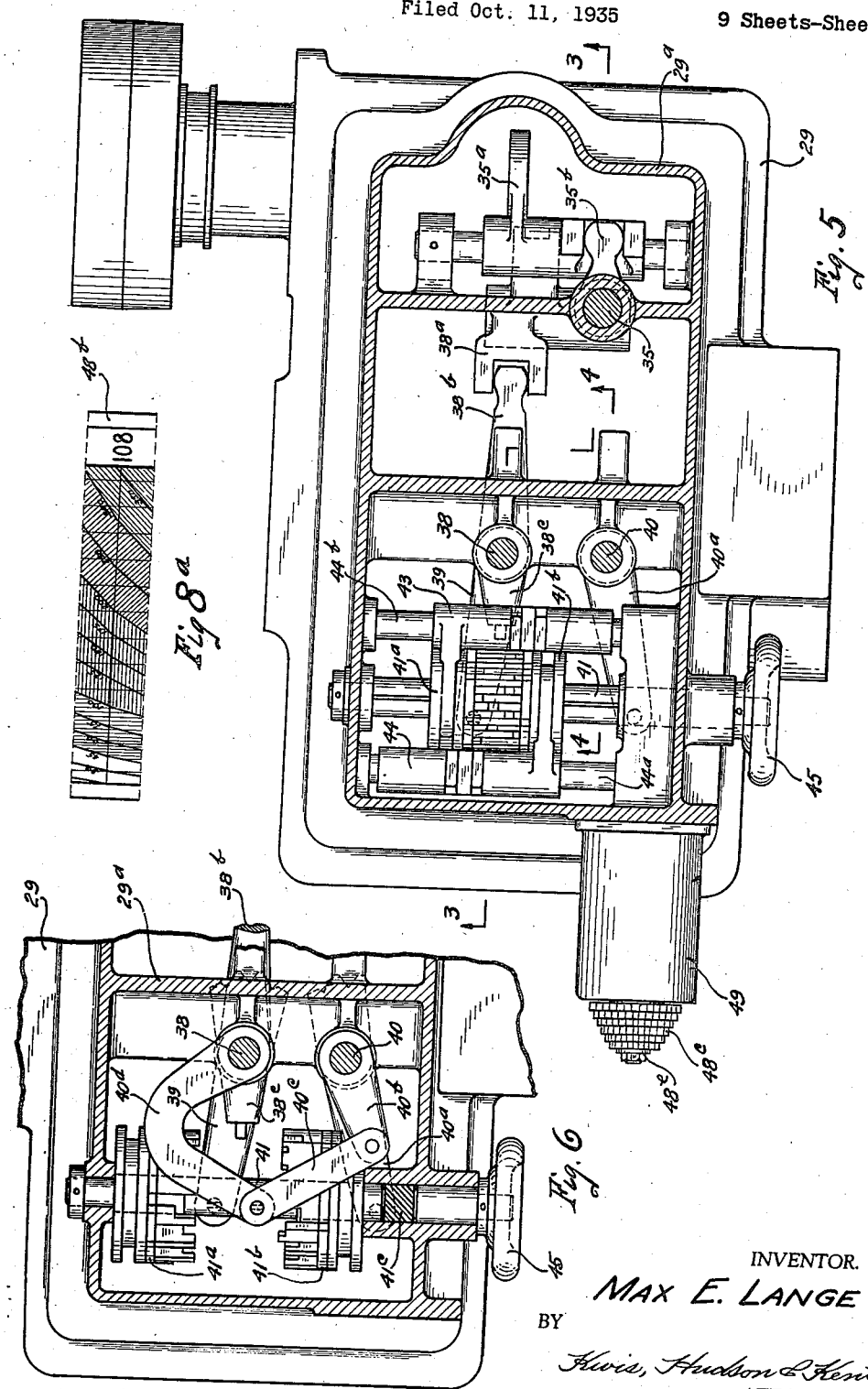

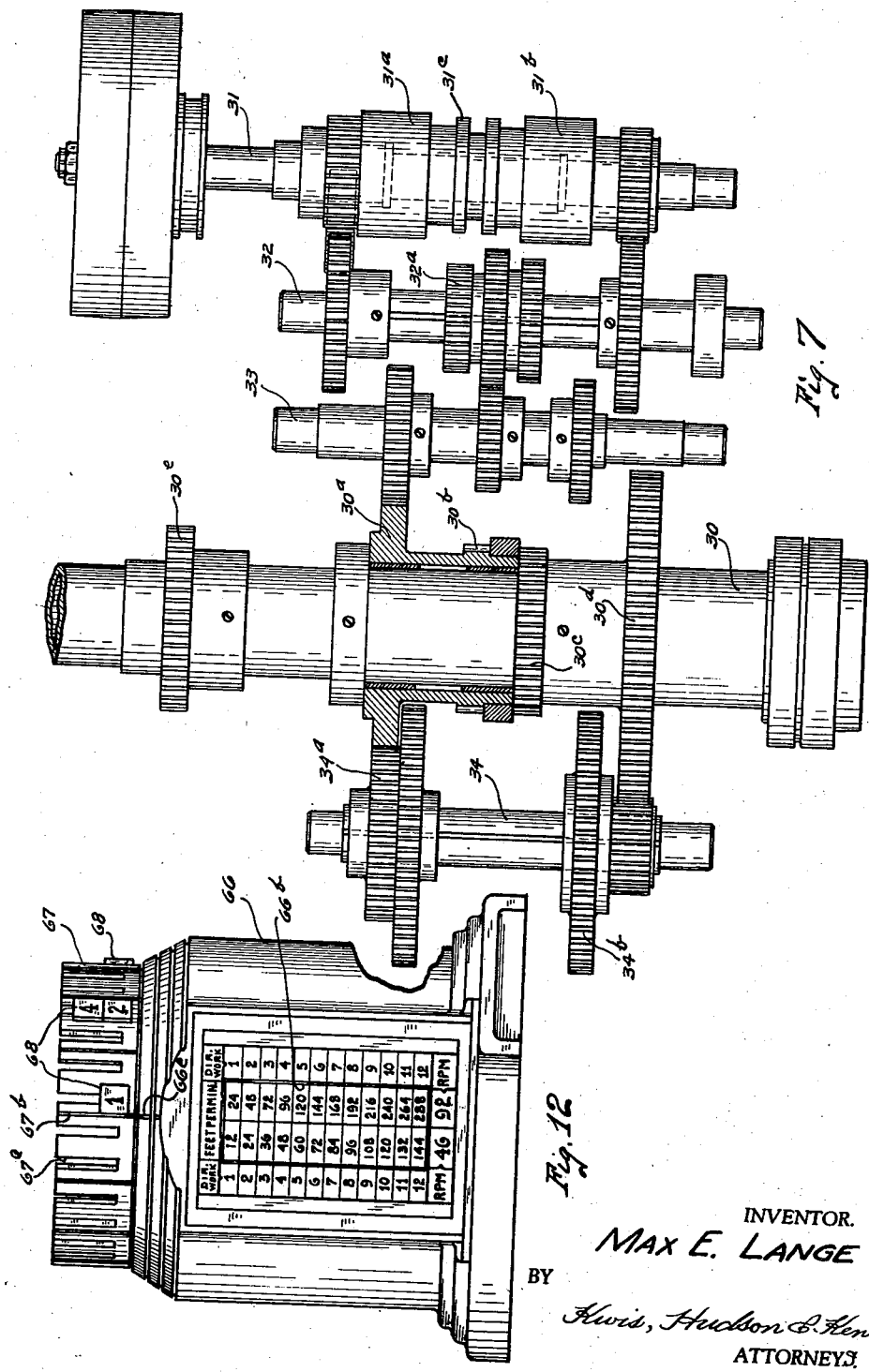

Aug. 15, 1939.  M. E. LANGE  2,169,765

MACHINE TOOL

Filed Oct. 11, 1935  9 Sheets-Sheet 6

INVENTOR.

MAX E. LANGE

BY

*Kwis, Hudson & Kent*

ATTORNEYS.

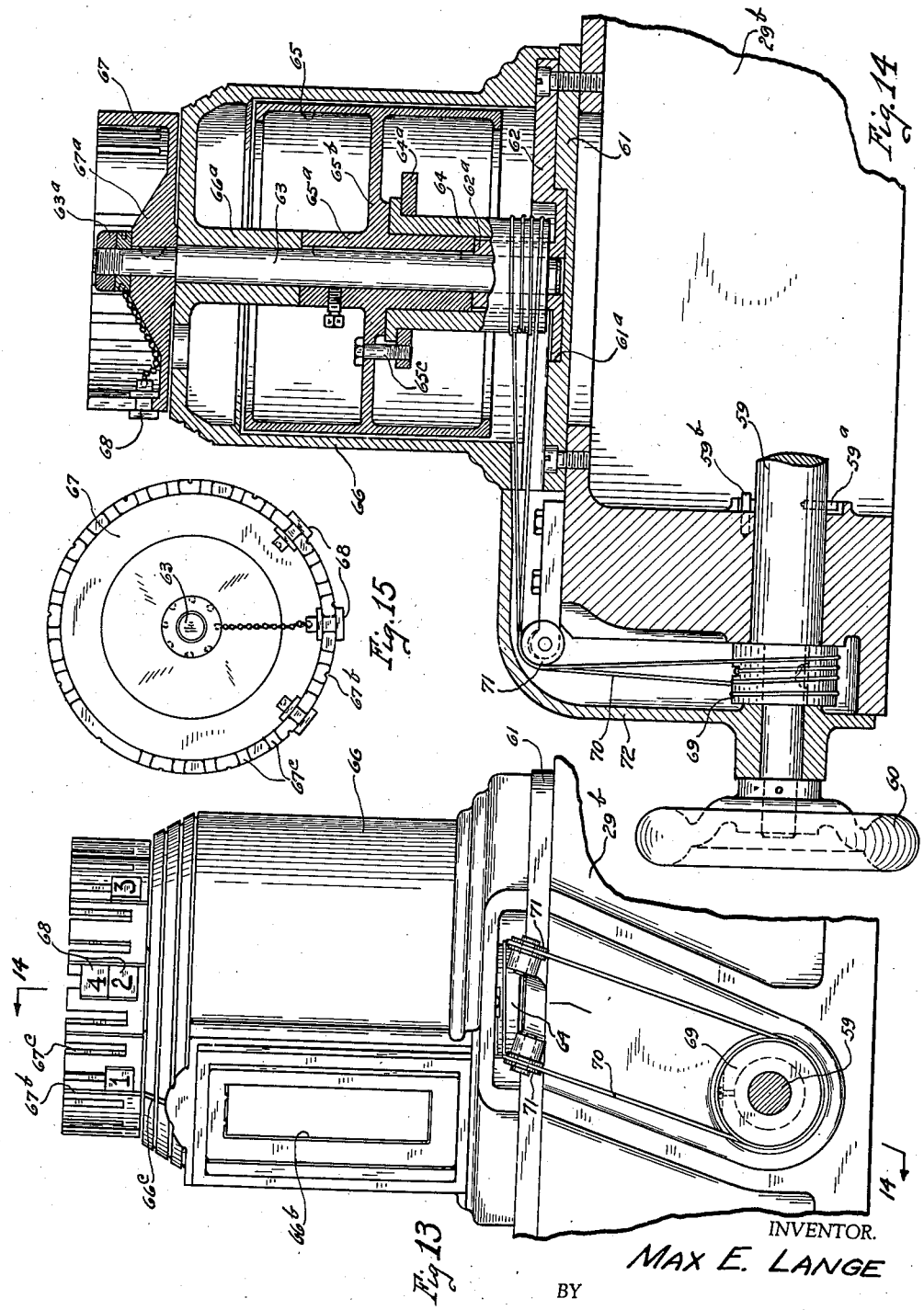

Aug. 15, 1939.    M. E. LANGE    2,169,765
MACHINE TOOL
Filed Oct. 11, 1935    9 Sheets-Sheet 8
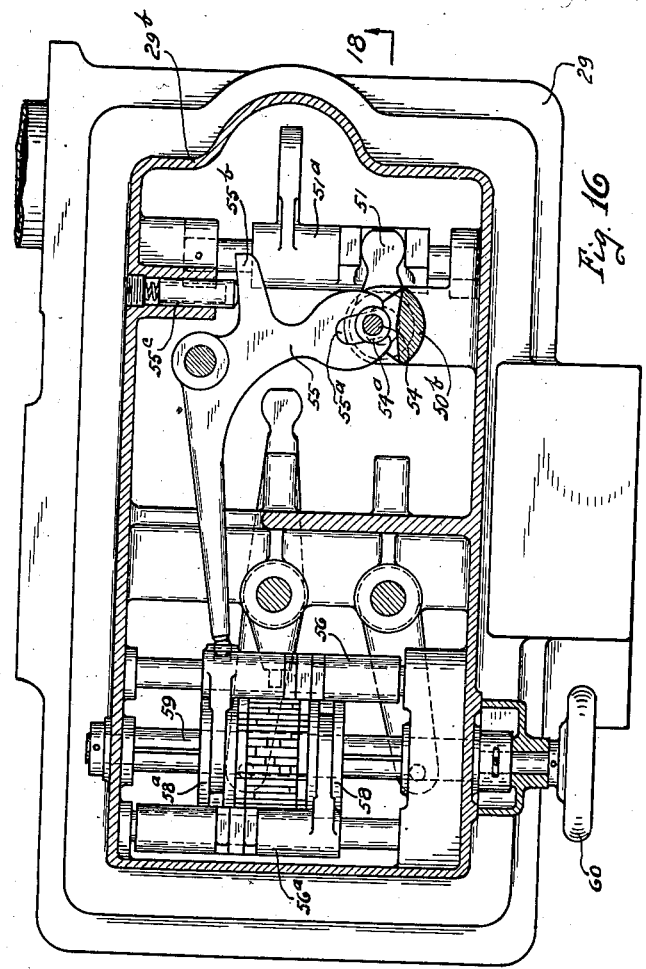
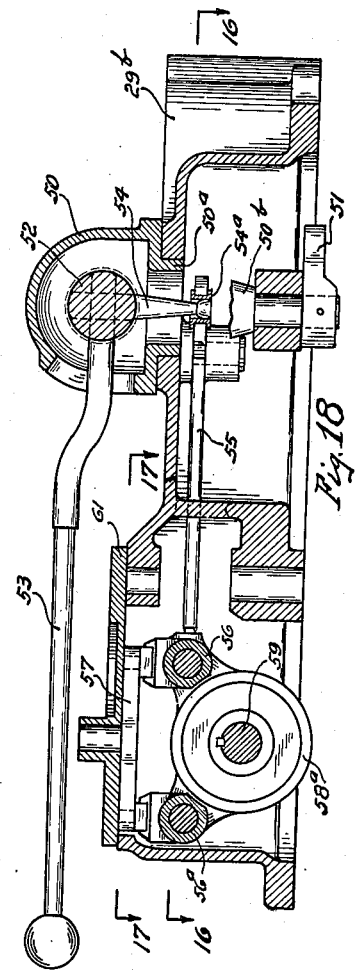
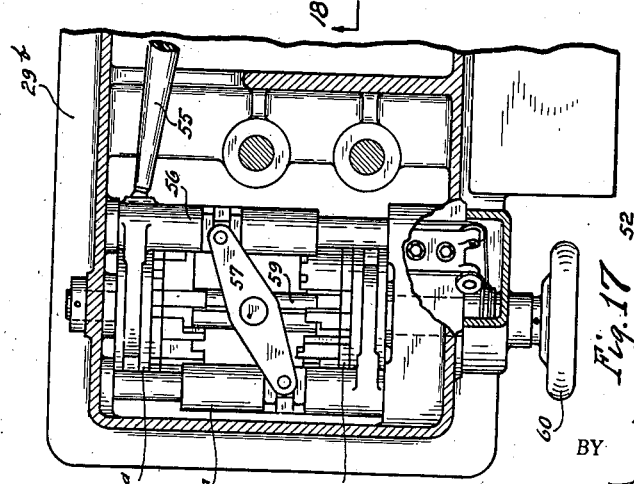
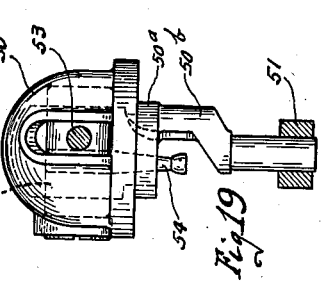
INVENTOR.
MAX E. LANGE
BY
Kwis, Hudson & Kent
ATTORNEYS.

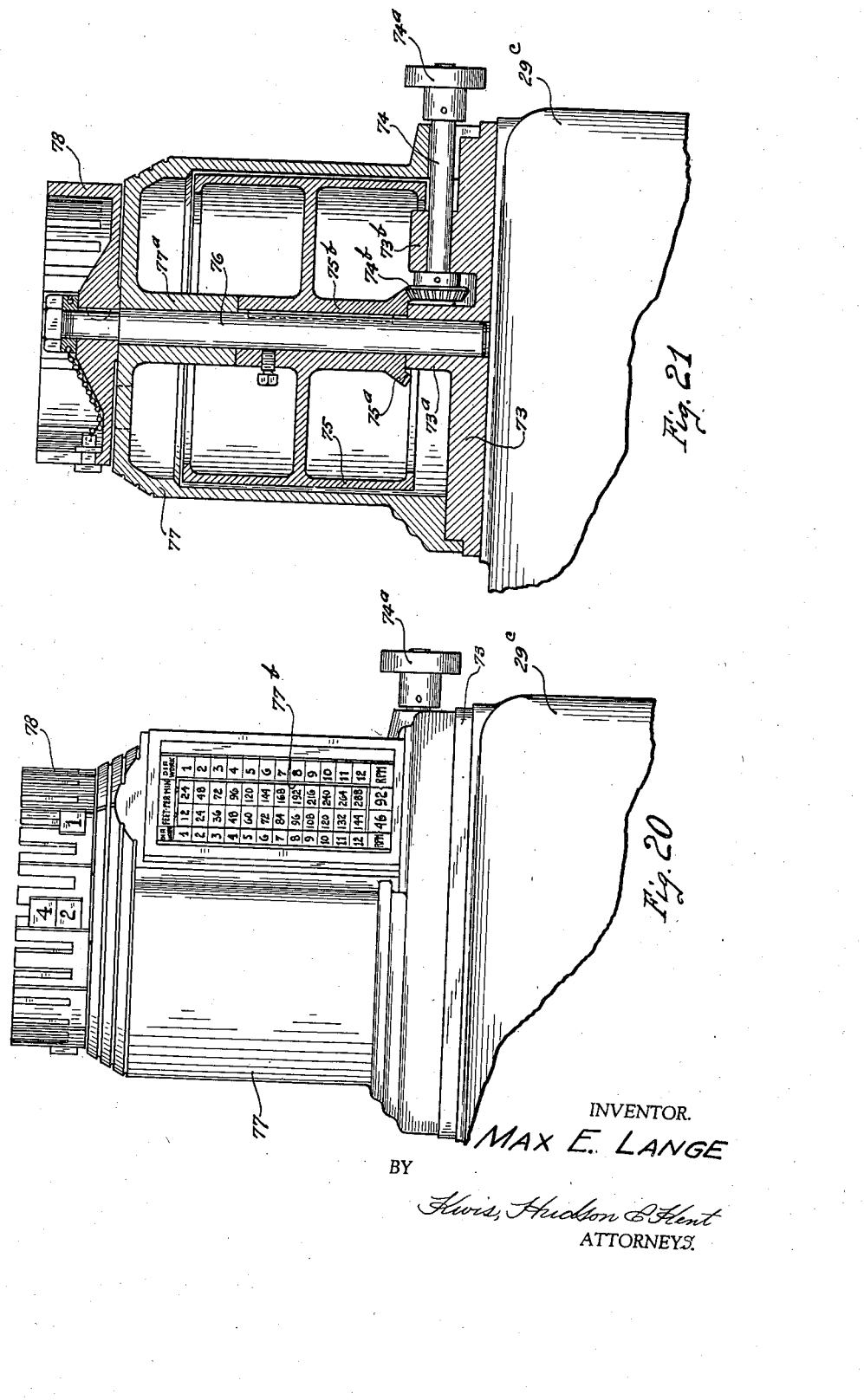

Patented Aug. 15, 1939

2,169,765

UNITED STATES PATENT OFFICE 2,169,765

MACHINE TOOL

Max E. Lange, Cleveland Heights, Ohio, assignor to The Warner & Swasey Company, Cleveland, Ohio, a corporation of Ohio Application October 11, 1935, Serial No. 44,518

45 Claims. (Cl. 82—29)

This invention relates to an indicating device for a machine tool wherein there is a movable member whose rate of movement is to be controlled. The present invention constitutes an improvement upon and/or an addition to the indicating devices shown in the Burger Patent No. 1,758,427, issued May 13, 1930 and the Van Hamersveld Patent No. 1,813,002, issued July 7, 1931.

An object of the invention is to provide an indicating device for a machine tool whereby the operator, from his knowledge of the maximum cutting speeds in feet per minute for particular cutting tools for various types of cuts, can determine the proper rate of movement for the movable member of the machine for the different operative steps in the complete work cycle and can calibrate the device with respect to the different operative steps in the complete cycle to visually indicate the rates of movement of the movable member for said steps and thus to form a production log which he can subsequently follow in machining work pieces of the same kind.

Another object of the invention is to provide an indicating device for a machine tool whereby the operator, from his knowledge of the maximum cutting speeds in feet per minute for particular cutting tools for various types of cuts, can determine during one operative step the proper rate of movement for the movable member of the machine for the next operative step in the work cycle, wherefore he may preselect during the first cycle, wherefore he may preselect during the first mentioned operative step the proper rate of movement for the movable member for the next step in the cycle.

A further object is to provide an indicating device for a machine tool whereby the operator, from his knowledge of the maximum cutting speed in feet per minute for particular cutting tools for various types of cuts and from the known diameters of work pieces, can determine the proper speed in revolutions per minute for the spindle for the different operative steps in the complete work cycle, and from such determination can calibrate the device with respect to the different operative steps in the complete cycle to visually indicate the proper spindle speeds required in the steps and to thus form a production log which he can follow efficiently in the machining of additional work pieces of the same kind.

Another object of the invention is to provide an indicating device for a machine tool whereby the operator, from his knowledge of the maximum cutting speed in feet per minute for the particular cutting tools for various types of cuts and from the known diameters of work pieces, can determine during one operative step in the complete work cycle the proper spindle speed in revolutions per minute for the next operative step in the cycle, and wherefore he may preselect during the first mentioned operative step the proper spindle speed for the next operative step.

Another object of the invention is to provide in a machine tool having a movable member and means for controlling the rate of movement of said member, an indicating device operatively associated with said means, and by means of which the operator, from his knowledge of the maximum cutting speeds in feet per minute for particular cutting tools for various types of cuts, can determine and obtain the proper rate of movement for said movable member for the different operative steps in the complete work cycle, and from such determination can calibrate such device with respect to the sequential operative steps of the work cycle to visually indicate the proper rates of movement for the movable member in each operative step and thus form a production log which he can follow in the machining of additional work pieces of the same kind.

Another object of the invention is to provide in a machine tool having a movable member and means for preselecting the rate of movement of said member, an indicating device operatively associated with said means and by means of which the operator, from his knowledge of the maximum cutting speeds in feet per minute for particular cutting tools for various types of cuts, can determine and preselect the proper rates of movement of said movable member for the different operative steps in the complete work cycle.

Another object of the invention is to provide in a machine tool having a rotatable spindle and means for preselecting the rates of rotation of said spindle, an indicating device operatively associated with said means and by means of which the operator, from his knowledge of the maximum cutting speeds in feet per minute of particular cutting tools for various types of cuts, and from his knowledge of the known diameters of the work pieces, can determine and preselect during one operative step in a work cycle the proper spindle speed in revolutions per minute for the next operative step, and from such determination can calibrate the device with respect to the sequential operative steps in the complete cycle to visually indicate in sequence the proper spindle speeds for said steps, and thus to form a production log which he can follow in the machining of additional work pieces of the same kind.

Another object is to provide in a machine tool an indicating device employing color bands to indicate cutting speeds in feet per minute.

Another object is to provide in a machine tool an indicating device which enables the machine to be operated efficiently and properly.

Further and additional objects and advantages not specifically referred to above will appear hereinafter during the detailed description which is to follow of several embodiments of the invention.

Referring to the accompanying drawings:

Fig. 1 is a front elevational view of a machine tool, and for purposes of illustration a turret lathe disclosing an embodiment of the invention applied to the head stock thereof for indicating the cutting speeds in feet per minute for various R. P. M.'s of the work spindle and for also indicating the number of sequential operative steps in the complete work cycle.

Fig. 2 is an end elevational view of the head stock of the machine tool shown in Fig. 1 looking from the right hand side of said figure, with a portion of the head stock and the indicating device shown in section.

Fig. 2a is a sectional view taken substantially on line 2a—2a of Fig. 2, looking in the direction of the arrows.

Fig. 3 is a transverse vertical section through the head stock of the machine shown in Fig. 1 and is taken substantially on line 3—3 of Fig. 5 looking in the direction of the arrows.

Fig. 4 is a fragmentary transverse vertical section taken substantially on line 4—4 of Fig. 5 looking in the direction of the arrows.

Fig. 5 is a transverse horizontal sectional view through the head stock of the machine shown in Fig. 1 and is taken substantially on line 5—5 of Fig. 3 looking in the direction of the arrows.

Fig. 6 is a fragmentary transverse horizontal sectional view taken substantially on line 6—6 of Fig. 3 looking in the direction of the arrows.

Fig. 7 is a diagrammatic view of the change speed gearing and clutches in the drive for the work spindle in the head of the machine shown in Fig. 1.

Fig. 8a (Sheet 4) is a fragmentary developed view of the drum shown in Fig. 8 and illustrates the manner in which the drum is colored.

Fig. 11 (Sheet 1) is a fragmentary elevational view of a head stock similar to the head stock shown in Fig. 1, but having associated therewith a different embodiment of the indicating device.

Fig. 12 (Sheet 5) is a detached elevational view of the indicating device shown in Fig. 11 on an enlarged scale.

Fig. 13 (Sheet 7) is a portion of a front elevational view of the head stock and indicating device shown in Fig. 11, and is taken looking from the right hand side of Fig. 11 on a scale similar to that of Fig. 12, the cover member being omitted to show the operative drive to the indicating device.

Fig. 14 is an irregular vertical sectional view taken substantially on line 14—14 of Fig. 13, looking in the direction of the arrows.

Fig. 15 is a top plan view of a portion of the indicating device shown in Fig. 13.

Fig. 16 is a view similar to Fig. 5 and is taken substantially on line 16—16 of Fig. 18 looking in the direction of the arrows, it being noted that the mechanism in the head as illustrated in Fig. 16 differs from the mechanism shown in Fig. 5.

Fig. 17 is a fragmentary horizontal sectional view taken substantially on line 17—17 of Fig. 18 looking in the direction of the arrows.

Fig. 18 is a vertical sectional view through the cover of the head stock shown in Fig. 16 and is taken substantially along line 18—18 of Fig. 16 looking in the direction of the arrows, with certain of the levers and supports therefor being omitted.

Fig. 19 is a detached view of a portion of the operating mechanism shown in Fig. 18.

Fig. 20 is a view similar in part to Fig. 12 but illustrating the indicating device as an independent manually operated unit, and Fig. 21 is a vertical sectional view through the indicating device shown in Fig. 20 and is taken substantially along the central line of the device.

Figure 8:
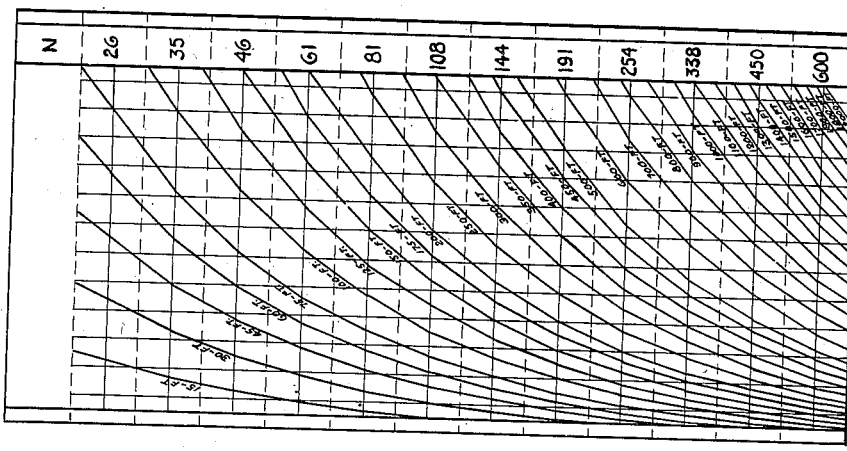
Fig. 8 is a developed view on an enlarged scale of the periphery of the rotatable indicia bearing drum of the indicating device illustrated in Figs. 1, 2 and 5.

It will be understood that although indicating devices embodying the present invention are illustrated herein as associated with the head stock of a turret lathe exteriorly thereof that this is done merely for purposes of illustration, inasmuch as the indicating devices are susceptible of advantageous use upon other forms of machine tools having movable members whose rates of movement are to be determined and varied and in other locations thereon, as for example, the indicating devices might be located within the head and visible through a window opening therein, or they might be located on the apron, bed or other part of the machine, particularly where there is a remote control for the movable member, such as is illustrated in the Lange and Van Hamersveld application, Serial No. 15,182.

Referring to Fig. 1, the machine tool shown therein comprises a bed 25 provided with suitable longitudinal ways 26, upon which the turret slide 27 travels and with a cross slide and carriage 28 arranged intermediate the turret slide and the head 29 of the machine. The head 29 is provided with a work spindle 30 which, in this instance, can be driven at any one of twelve speeds through speed change gearing now to be described.

It will be understood that the spindle 30 can be driven at any one of twenty-four speeds in the event that a two speed motor is employed having high and low speed ranges and, in fact, the embodiments of the invention illustrated in connection with Figs. 12 to 21 inclusive contemplate the use of a motor having a double speed range.

Referring to Fig. 7 (Sheet 5) which diagrammatically shows the speed change gearing in the head 29, it will be seen that the main drive shaft 31 which is driven through a belt and pulley drive from the motor (not shown) can drive the spindle 30 at twelve speeds in either the forward or reverse directions. The shaft 31 is provided with clutches 31a and 31b and a shiftable clutch member 31c for obtaining the forward or reverse drives, and a shaft 32 driven from the shaft 31 carries a three-step gear cone 32a for driving a shaft 33 at any one of three speeds in the forward or reverse directions. The shaft 33 drives a shaft 34 through a gear 30a formed on a sleeve which is freely rotatable on the spindle and through a rear two-step gear cone 34a on the shaft 34 which meshes with the gear 30a or a second gear 30b also formed on the freely rotatable sleeve on the spindle. A forward two-step shiftable gear cone 34b drives the work spindle by means of gears 30c and 30d fixedly mounted on the spindle. As is well understood in the art, the spindle 30 is also provided with a gear 30e for driving the feed trains for the slides upon the ways 26.

The mechanism for preselecting during one operative step in the complete work cycle the spindle speed for the following step therein and the mechanism for shifting the clutches and the gear cones to obtain the spindle speed thus preselected are identical with similar mechanism shown in Lange application Serial No. 8,319, filed February 26, 1935, except in the present illustration, for the purpose of simplicity, spring points are employed for holding the gear shifting levers in shifted position.

In view of the disclosure in the said Lange application it is deemed sufficient to merely briefly describe the preselecting and gear shifting mechanisms illustrated therein.

The shiftable clutch member 31c associated with the clutches 31a and 31b on the main drive shaft 31 is shifted by means of a yoke 35a operatively connected to a lever 35b carried on the lower end of a vertical shaft 35 which is rockably supported in the cover 29a of the head stock. The upper end of the shaft 35 is pivotally connected to a rockable bracket 36 which carries the control lever 37, wherefore when said lever is moved in a horizontal plane the shiftable clutch member will be moved into engagement with either the clutch 31a or the clutch 31b or into a center disengaged position.

The three-step gear cone 32 is shifted by means of a shiftable yoke 38a carried by a lever 38b which is fixed to the lower end of a vertically extending shaft 38 mounted in the cover 29a.

The rear two-step gear cone 34a is shifted by means of a lever 39 which is loosely mounted on the shaft 38. The front two-step gear cone 34b is shifted by means of a lever 40a which is fixed to the lower end of a vertically extending shaft 40 mounted in the cover 29a and having secured to it adjacent its upper end a lever 40b which, in turn, is pivotally connected to one end of a link 40c which has its opposite end pivotally connected to one end of a bent lever 40d, the opposite end of which is loosely mounted on the shaft 38 above a lever 38c which is fixed to the shaft.

The levers 38c, 39 and 40d carry pins which are equally spaced from a common center and lie between endwise movable and rotatable preselecting spools 41a and 41b splined on a shaft 41. The spools 41a and 41b are provided on their adjacent sides with a series of long and short cooperating projections and recesses as well as cooperating projections of equal length. When the spools are moved endwise toward each other certain of the projections will engage certain of the pins carried by the levers to move one or more of said levers to shift one or more of the shiftable gear cones in the head to obtain the desired speed for the work spindle.

The shaft 41, when the spools have been moved endwise to their outermost position, can be rotated so as to position certain of the cooperating projections on the spools in operative relation with respect to the pins carried by the levers, wherefore when the spools are again brought in toward each other certain or all of the pins on the levers will be engaged to move the levers to shift the desired gear cones.

The spools are given an endwise movement by means of an equalizer bar 42 fixed to the lower end of a vertical shaft 42a rockably mounted in the cover 29a of the head stock. The opposite ends of the equalizer bar 42 are provided with shoes engaging in slots formed in shiftable sleeves 43 and 44 carried by rods 44a and 44b arranged above but parallel to the shaft 41, while the sleeves 43 and 44 have yokes operatively engaging, respectively, the spools 41a and 41b. The shaft 41 and the spools 41a and 41b are given their rotative movement by means of a hand wheel 45 mounted on an extension of the shaft 41 at the inner end of the head and adjacent the front thereof where it is easily reached by the operator. The vertical shaft 42a has mounted on its upper end above the cover 29a to rock with the shaft a disk 46 which has a forwardly extended arm (as viewed in Fig. 3) that is connected to one end of an adjustable link 47, the opposite end of which is pivotally connected to the rockable bracket 36, wherefore when the control lever 37 is moved vertically rocking movement will be imparted to the disk 46 and the equalizer bar 42 to move the spools endwise an equal distance toward or away from each other as the case may be, it being understood that upward movement of the lever moves the spools endwise away from each other (as shown in Fig. 6) while downward movement of the lever moves them inwardly toward each other (as shown in Fig. 5) to effect a shifting of the gear cones through the levers and pins carried thereby.

The control lever 37 when it is moved horizontally controls the shiftable clutch member on the main drive shaft 31 for starting or stopping the drive for the spindle in either the forward or reverse direction, and it controls the endwise movements of the spools when it is moved vertically as has just been explained, it being remembered that the spools when in their separated or outer position can be rotated to predetermined positions by means of the hand wheel 45.

The shaft 41 is provided with a spiral gear 41c which meshes with a similar spiral gear 48a on a shaft 48 that projects beyond the cover 29a at the front of the head. The projecting portion of the shaft 48 extends through a cylindrical housing 49 fixed on the front face of the cover 29a and has secured thereto within the housing 49 a drum 48b. The shaft 48 and drum 48b have a bearing in the housing and the shaft extends beyond the front end of the housing and carries a plurality of adjustable disks 48c (see Fig. 2), said disks being held in adjusted position by means of a pin 48d extending through the disks and into an opening in the hub of the drum 48b and by means of a nut and washer 48e secured on the end of the shaft 48. As many disks 48c will be employed as there are operative steps in the complete work cycle, and each disk will carry on its circumference a number corresponding to one of the operative steps in the cycle and preferably the innermost disk will designate the first operative step by the number one, while successive and outer disks will designate the following operative steps, as, for example, by the numbers 2, 3, 4, 5 and 6 (see Figs. 9 and 10). Each disk 48c is provided with thirteen openings 48f corresponding to the twelve spindle speeds and the neutral position, wherefore the disks can be adjusted relatively to each other to different relative positions by sliding the disks onto the shaft 48 with the locating pin 48d extending through one of the openings 48f in each disk, thereby locating the disks in the desired position, after which the nut 48c and its washer is screwed on the shaft to lock the disks in adjusted position.

The housing 49 is provided on its side adjacent to the hand wheel 45 with an opening in the form of a window and has arranged around three sides of the periphery of the opening an indicia bearing boss or surface 49a. This surface adjacent the outer end of the housing includes a pointer 49b which cooperates with the numbers on the disks 48c representing the operative steps in the work cycle. The surface 49a above and below the opening is provided with numbers and cooperating pointers indicating the various diameters of work and also with indicia and a cooperating pointer representing the R. P. M. of the work spindle. A portion of the drum 48b, which rotates inside the housing, is visible through the opening and said drum carries on its periphery indicia representing cutting speeds in feet per minute relative to the diameters of the work and also indicia representing spindle speeds in revolutions per minute.

It will be seen that when the drum is rotated the different cutting speeds in feet per minute will cooperate with the numbers and pointers representing different diameters of work, while the spindle speeds in revolutions per minute will cooperate with the pointer and indicia on the housing representing the revolutions per minute.

As clearly shown in the developed view of the periphery of the drum, see Fig. 8, the periphery of the drum is divided into thirteen circumferentially spaced divisions, one representing neutral position by the letter "N" and the others the twelve different speeds of the work spindle and each bearing a number indicating such speeds in revolutions per minute. The letter "N" and the numbers indicating the spindle speeds are successively visible through the opening in the housing when the drum is rotated and cooperate with the letters R. P. M. and the adjacent pointer on the housing. The twelve spaces on the periphery of the drum representing the spindle speeds in revolutions per minute are covered by curves indicating the cutting speeds in feet per minute for the different diameters of work and for the different spindle speeds. Through the window portions of these curves can be seen for each spindle speed, and as shown in Fig. 9 for example, the portions of the curves visible through the window opening lie in the circumferentially spaced division of the periphery of the drum representing a spindle speed of forty-six per minute.

Figures 9, 10:
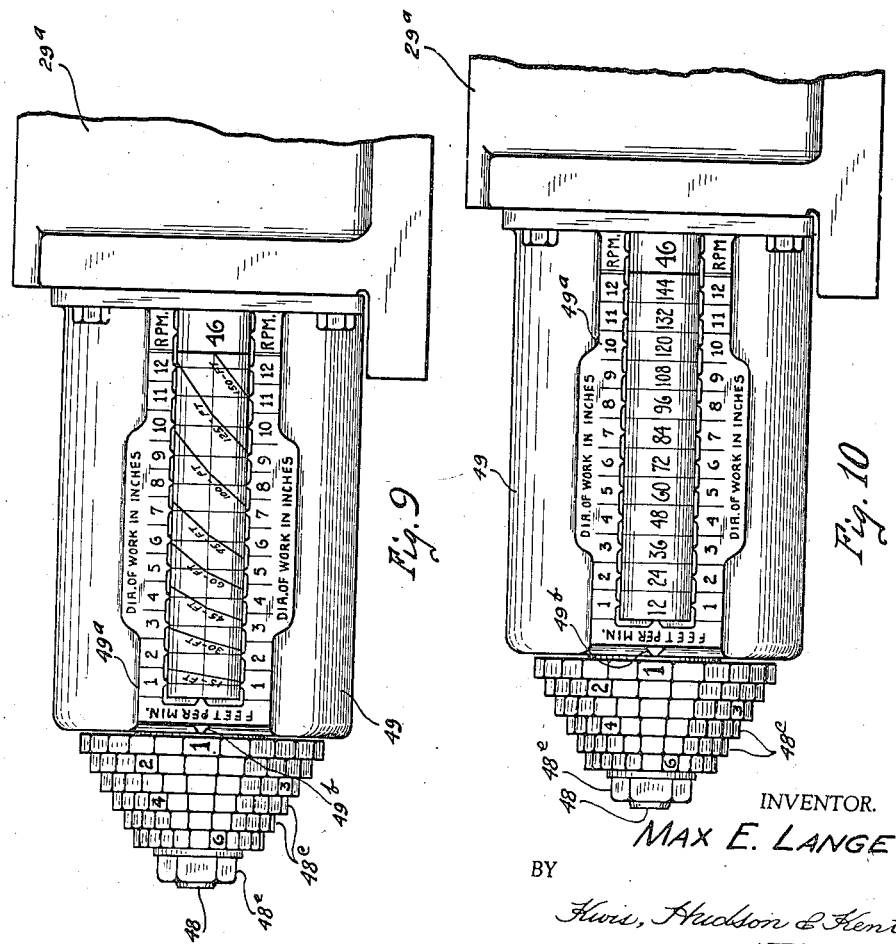
Fig. 9 is an elevational view on the same scale as Fig. 8 of the indicating device shown in Figs. 1, 2 and 5, said device being provided with a drum having the type of indicia shown in Fig. 8.
Fig. 10 is a view similar to Fig. 9 but the device embodies a drum having a modified form of indicia from that shown in Fig. 9.

The periphery of the drum may be provided in each of its twelve circumferentially spaced divisions representing spindle speeds with a series of numbers representing cutting speeds in feet per minute in place of the curves shown in Figs. 8 and 9, and such an arrangement is illustrated in Fig. 10.

After the machine has been set up for continued production of work pieces of the same kind, the hand wheel 45 is rotated in the operation of the machine to bring the numeral 1 on the disks into alignment with the pointer 49b to preselect the spindle speed for the first operative step in the cycle and the spindle speed as indicated in Figs. 9 and 10 will be forty-six R. P. M. When the machine is operating in the first operative step of the cycle the operator turns the hand wheel to bring the number 2 on the disks into alignment with the pointer 49b and thus to shift the drum two spaces, whereupon 26 will appear to indicate a spindle speed of twenty-six R. P. M. The numerals 3, 4, 5 and 6 on the disks can be successively brought into alignment with the pointer 49b to indicate the spindle speeds for the other operative steps in the cycle.

The manner in which the invention is employed in actual practice and the operation of the machine for completing a work piece will now be described. A machine embodying the invention can be advantageously used for the machining of a few or a large number of work pieces as the case may be. In either event the operator will proceed as follows:

Assuming that the control lever is in neutral and in its elevated position and the front two-step gear cone is disengaged from the work spindle, the letter "N" on the drum of the indicating device will be visible through the window opening in the housing 49. The operator then positions a work piece in the chuck of the spindle and knowing the maximum cutting speed in feet per minute for the type of cut of the tool for the first operation in the cycle and the diameter of the work, he then turns the hand wheel 45 to rotate the drum to bring the indicia representing the closest approximation to the maximum cutting speed of the tool into line with the particular diameter of the work, as indicated on the indicating device, in order to obtain the proper R. P. M. for the work spindle. For example, if the maximum cutting speed for the type of cut of the tool to be used in the first operative step is sixty feet per minute and the diameter of the work is five inches, the operator rotates the dial in the proper direction from the letter "N" and follows the curved line representing the 60 feet, see Fig. 8, until such curved line intersects the vertical line between the numerals 5 on the housing 49 at approximately midway of the window, at which time the numeral 46 for the proper R. P. M. for the work spindle will be visible through the window opening, see Fig. 9. The rotation of the drum of the indicating device has also rotated the spools to preselect the proper R. P. M. for the work spindle, wherefore in order to commence the operative cycle the operator merely moves the main control lever downwardly to bring the spools inwardly to shift the gear cones to obtain the preselected speed and then moves the lever horizontally to engage the main drive clutch to effect a forward or reverse rotation of the spindle at the proper speed, after which he moves the lever upwardly to move the spools outwardly.

While the machine is operating during the first operative step the operator, knowing the maximum cutting speed in feet per minute for the type of cut for the tool which is used in the second operative step and the diameter of the work, again rotates the dial to determine the proper R. P. M. for the second operative step, as, for example, if the maximum cutting speed in feet per minute for the tool of the second operative step is 250 feet and the diameter of the work in inches is still five, the drum of the indicating device will be rotated until the curved line on its periphery representing 250 feet per minute cutting speed intersects the vertical line between the numerals 5 on the housing 49 approximately midway thereof, at which time the number 191 will appear in the window opening and will show the proper R. P. M. of the work spindle, see Fig. 8.

As soon as the first operative step has been completed the operator moves the lever which is in its uppermost position horizontally to neutral position to disengage the main drive clutch and then continues that movement downwardly to move the spools inwardly to shift the gears to obtain the desired and established spindle speed of 191 R. P. M. for the second operation and follows the downward movement of the lever with a horizontal movement thereof to again engage the main drive clutch, after which he moves the lever vertically upwardly to again move the spools to their outermost position wherein they can be rotated to preselect the spindle speed for the following operative step. The operator continues in a similar manner to determine the proper R. P. M. of the spindle for each of the remaining operative steps in the complete work cycle.

During the last operative step in the cycle the operator rotates the hand wheel to bring the letter "N" on the drum under the R. P. M. and at the end of the last operative step manipulates the control lever to stop the machine and disengage the front two step gear cone from the spindle for the purpose of unloading the finished work piece and loading a new work piece thereon.

If the machine is to be employed for the machining of a large number of work pieces of the same kind the operator, while operating on the first piece, having determined the correct R. P. M. for the work spindle for the first operative step, as explained above, and with the numeral 46 appearing in the window, then positions on the shaft 48 a disk 48c with the number 1 on its circumference in line with the pointer 49b.

When the operator has determined the correct R. P. M. for the second operative step, as has been explained, he positions a second disk on the shaft 48 with the number 2 on said disk in line with the pointer 49b, it being understood that the number 1 on the first mentioned disk has moved out of alignment with the pointer during the determination of the correct R. P. M. for the second operative step. The operator continues throughout each of the operative steps to position disks upon the shaft 48, with the numbers representing the different operative steps in line with the pointer 49b, while the correct spindle speed for each step appears in the window, attention again being called to the fact that where the speeds of the work spindle in the different operative steps vary, the numbers on the disks representing such operative steps will vary in location circumferentially of the disks and with relation to the pointer.

After the disks have been positioned during the first complete operative cycle and locked in place, the operator need not again determine the correct R. P. M. for the work spindle for a given cutting speed in feet per minute and diameters of work for the various operative steps, inasmuch as he now has a production log which he can follow and merely brings the numbers on the disks 48c, indicating the operative steps in the cycle, successively into alignment with the pointer 49b, which act automatically preselects the correct spindle speed. There may be instances, however, wherein the determined R. P. M. for a given cutting speed and diameter of work needs to be varied, due to the fact that all work pieces may not be of the same degree of hardness. The operator will readily note the variations in the degree of hardness of the work pieces, and in such instances will depart from the routine of the production log and proceed as heretofore described in connection with the first work piece to determine the proper R. P. M. for a lower cutting speed in feet per minute and suitable for the harder material.

In order to facilitate the determination of the spindle speed for an operative step, the periphery of the drum may be provided with curves, as in Fig. 8, indicating cutting speeds in feet per minute, while different portions of the spaces between said curves are variously colored to indicate varying cutting speed ranges, as shown in Fig. 8a. As for example, the portion of the spaces between the curves representing cutting speeds less than 45 feet per minute may be colored white, the portion included in the range between 45 feet and 100 feet may be colored red, the portion in the range 100 feet to 200 may be colored blue, the portion in the range 200 feet to 300 feet may be colored green, and the portion in the range 300 feet to 400 feet may be colored brown. In Fig. 8a, as viewed through the window of the housing, a portion of the periphery of the drum having a spindle speed of 108 R. P. M. is shown, and it will be noted that the various color bands representing different ranges of cutting speeds in feet per minute are herein indicated. The operator knowing the cutting speed of the tool in feet per minute to lie within a certain range can follow the proper color band while rotating the drum until a portion of the band comes into alignment with the known diameter of the work, at which time the proper spindle speed will appear in the window opening. Certain cutting tools will have a maximum cutting speed in feet per minute lying in one range as represented by a color band while other tools might lie in a different range as represented by a different color band, and hence the operator in operating the machine may follow the color bands in determining the correct spindle speeds. The other indicating devices illustrated herein and later to be described may be similarly provided with colored bands or zones representing different ranges in cutting speeds in feet per minute.

The numbers on the drum of the indicating device shown in Fig. 10 and representing cutting speeds in feet per minute have been determined from the curves representing cutting speeds in feet per minute, as shown in Fig. 8, with relation to different diameters of work, for example, it will be noted in Fig. 9 that the curve representing the cutting speed of 60 feet per minute substantially intersects the vertical line between the numerals 5 for the diameter of work in inches at the middle point of said line, and by reference to Fig. 10 it will be seen that the numeral 60 on the drum lying between the numbers 5 on the housing indicates the cutting speed per minute for a work piece of five inch diameter at a spindle speed of 46 R. P. M.

In further explanation it should be noted in Fig. 9 that the curved line on the drum representing cutting speeds of 100 feet per minute intersects the middle point of the window opening somewhat to the right of the vertical line between the numbers 8 representing the diameters of the work. It will be apparent that the correct cutting speed in feet per minute for work pieces of eight inch diameter is slightly less than 100 feet, and, therefore, by reference to Fig. 10 it will be seen that the numeral 96, representing the cutting speed in feet per minute, is arranged between the numbers 8 representing the diameter of the work in inches. In other words, in Fig. 10 the direct values are determined and read on the drum in numbers in place of reading and determining the values by the curves, as in Fig. 9, and that the operator in operating a machine employing the indicating device shown in Fig. 10 can proceed in the same manner as previously discussed with respect to the indicating device shown in Fig. 9.

Referring to Figs. 11 to 19 inclusive, there is shown therein a modified form of indicating device as well as a modified form of the mechanism for operating the spools in their endwise movements by the main control lever. Referring specifically to Figs. 16 to 19 inclusive, the cover 29b of the head stock is provided with a bored opening in which is rotatably fitted a bearing portion 50a of a rotatable bracket 50. A downward extending arm 50b of the bracket (see Figs. 18 and 19) projects through a bearing boss in the cover 29b and has fixed at its lower end a lever 51 similar to the lever 35b in the first described embodiment and functioning to shift a slidable yoke 51a which shifts the movable member of the main drive clutches similarly as in the form first described. The bracket 50 has thickened end walls as viewed in Fig. 19, and is provided in the right hand end wall with a counterbored recess and in the left hand wall with a bored opening in alignment with the recess, the outer portion of the bored opening being threaded.

A cylindrical shaft 52 is rockably supported in the counterbored recess and in the unthreaded portion of the bored opening in the bracket and is prevented from endwise movement by means of a removable plug screwed into the threaded portion of the bored opening. The shaft 52 is provided with a horizontal opening in which is fitted the end of the main control lever 53 and with a second opening arranged at right angles to the first mentioned opening and slightly to one side thereof which receives a lever rod 54 that extends downwardly from the shaft 52 and on its lower tapered end is provided with a spherical head.

The rocking movement of the main control lever 53 in a vertical plane rotates the shaft 52 and produces a rocking movement to the lever rod 54 and since the spherical lower end of said lever rod is arranged within a bushing 54a, which is slidably mounted in a slot 55a arranged in one end of a bell crank lever 55 that is pivotally supported on the underside of the cover 29b, a rocking movement is imparted to the bell crank lever 55.

The other arm of the bell crank lever 55 has a spherical end portion which is operatively connected to a slidable sleeve 56 that corresponds to the sleeve 43 in the first described form of spool operating mechanism. It will be seen that when the lever 55 is rocked the sleeve 56 will be given an endwise movement as will also the sleeve 56a which is operatively connected to the sleeve 56 through the equalizer bar 57 and, in turn, the spools 58 and 58a, corresponding to the spools 41b and 41a, previously described, will be moved endwise equal distances toward or away from each other as the case might be. The arm of the bell crank that is operatively connected to the lever rod 54 is provided with an extended portion 55b against which a spring plunger 55c engages, wherefore under the action of said spring plunger the lever 55 is normally urged in a direction to move the spools endwise away from each other and to cause through the intermediary of the lever rod 54 an upward movement of the main control lever 53.

The spools 58 and 58a are splined upon a rotatable shaft 59 corresponding to the shaft 41 previously described, which shaft, as in the previous form, extends beyond the inner end of the cover of the head stock and is provided with a hand wheel 60 corresponding to the hand wheel 45, wherefore when said hand wheel is rotated when the spools are in their most outward position the shaft 59 and the spools 58 and 58a will also be rotated to bring the cooperating sets of long and short and equal projections on the adjacent faces of the spools into position to preselect the speed of the work spindle for the next operative step.

As in the previously described construction, it is proposed in connection with the construction just described to employ an indicating device functioning similar to those previously described, such indicating device being mounted upon the upper side of the cover 29b of the head stock and taking in certain of its elements substantially the form of the indicating device shown in Van Hamersveld Patent No. 1,813,002 previously referred to.

This indicating device comprises a base plate 61 secured to the upper side of the cover 29b and provided with a centrally arranged counterbore 61a, see Fig. 14. A bearing plate 64 is mounted upon the base plate 61 and has an off-set portion fitting the counterbore in the base plate, which portion is provided with an upstanding bearing boss 62a which receives a rotatable shaft 63. A sleeve 64 has its lower end surrounding the boss 62a and circumferentially grooved to form a pulley drum for a purpose later to be explained. The upper portion of the sleeve 64 receives the lower end of the hub 65a of an indicia bearing drum 65 which is keyed to the shaft 63 and has a horizontally extending circular rib 65b radiating from the hub and which bears upon the flanged upper end of the sleeve 64. The sleeve 64 carries beneath the flanged upper end a washer 64a which has threaded openings to receive a plurality of clamping screws 65c carried by the rib 65b of the drum 65, wherefore it will be seen that when said screws are turned in the proper direction the washer 64a and the rib 65b of the drum 65 will be drawn together to clamp the flange at the upper end of the sleeve 64 therebetween, which arrangement enables the drum to be adjusted or properly located with respect to the pulley on the lower end of the sleeve 64. A cylindrical housing 66 encloses the drum 65 and has a downwardly extending bearing boss 66a receiving the shaft 63 and forming a bearing therefor. The housing 66 is provided with an opening 66b constituting a window through which the periphery of the drum is visible, it being noted that the outer surface of the housing 66 surrounding the opening 66b carries indicia representing various diameters of work and various R. P. M. for the work spindle, (see Figs. 12, 13 and 14). The periphery of the drum 65 is provided with suitable rows of numbers representing cutting speeds in feet per minute and also numbers indicating the R. P. M. of the work spindle, it being understood that the numbers were plotted on curves such as shown in Fig. 8. It will also be noted that two ranges of R. P. M. are shown, the lower corresponding to the curves and the higher range being double the lower range. A cup-shaped member 67 having a thickened central bottom portion 67a through which the reduced upper end of the shaft 63 extends is keyed to such reduced end of the shaft so that the cup member will rotate with said shaft and drum 65.

The cup member 67 is provided with thirteen circumferentially spaced lines 67b representing the twelve different spindle speeds and the neutral position and adapted to be brought into registry with a vertical line 66c located centrally above the window opening 66b. It will be noted that the cup member on each side of twelve of the lines 67b and equally spaced therefrom is provided with downwardly extending slots 67c adapted to removably receive number blocks 68 which carry on their outer faces numbers representing operative steps in a work cycle, said number blocks having chains connected to their inner ends which, in turn, are fastened to a washer on the shaft 63 below a clamping nut 63a.. As many number blocks 68 will be provided as there are maximum operative steps in a complete work cycle, and such blocks as are not used in machining a particular work piece which requires less than the maximum number of operative steps can lie in the cup-shaped member, it being understood that the chains referred to are of sufficient length to permit any of the blocks to be positioned in any of the slots and when the blocks are not in use to prevent the loss of the same.

In the form of construction just described the use of a motor having high and low speed ranges is contemplated, and provision for the same is illustrated upon the indicating device. When the high sped range of the motor is employed in a particular operative step the number block bearing the number for that step can be positioned in the slot to the right hand side of the proper vertical line 67b, while when the low speed range of the motor is employed the number block will be positioned in the slot to the left hand side of the line.

Reference to Fig. 12 will clearly indicate that for the first operative step the high speed range of the motor is being employed and the work spindle is rotated at 92 R. P. M., wherefore the number block bearing the number 1 is positioned in the slot 67c to the right hand side of the line 67b. It will also be noted by reference to Fig. 12 that operative steps 2 and 4 require the same spindle speeds, and in such case the number blocks indicating these operative steps can be placed in the same slot 67c one above the other. Likewise, it should be observed that the number blocks representing operative steps 2 and 4 are located in the slot to the left of the adjacent line 67b indicating that the low speed range of the motor is employed for these operative steps and the correct speed of the work spindle will be indicated at the lower left hand corner of the window opening in the housing 66.

In order to automatically operate the indicating device when the preselecting mechanism is operated the shaft 59 beyond the end of the cover 29b of the head has keyed thereto a pulley drum 69 around which is fastened a cable 70 and which passes upwardly over guide pulleys 71 and thence around the pulley formed on the lower end of the sleeve 64 and previously referred to.

It will be evident when the hand wheel 60 is rotated to rotate the shaft 59 and the spools 58 and 58a to preselect a work spindle speed for the next operative step, the drum 65 will be rotated in an equal degree to bring the indicia representing the proper spindle speed and cutting speeds in feet per minute into view in the window opening 66b of the housing 66. The shaft 59 is provided with a pin 59a which contacts a stationary pin 59b mounted in the cover 29b of the housing when the letter "N" is visible through the window in the housing of the indicating device, wherefore it will be seen that the hand wheel 60 can be alternately rotated in opposite directions. A cover 72 is secured over the cables 70 to form a housing therefor, as clearly shown in Fig. 14.

It will be understood that the operator can rotate the hand wheel 60 to bring the number on the drum representing the maximum cutting speed in feet per minute of the tool used in a particular operative step into horizontal alignment with the number representing the known diameter of the work on the housing 66, and when thus positioned the drum will indicate the correct R. P. M. for the work spindle and whether or not the high or low range speed of the motor is employed, it being understood that simultaneously such spindle speed is automatically preselected. When the spindle speed has been determined and preselected the operator starts the motor at either high or low speed, as indicated, brings the control lever 53 downwardly to shift the gear cones to obtain the preselected speed, and then horizontally to engage the main driving clutch to operate the spindle at said speed, after which he raises the control lever 53 to move the spools outwardly, and then determines and preselects the spindle speed for the next operative step, while the machine is operating in the first step. If the machine is set up for continued production on the same kind of work piece, the operator will position the number blocks in the correct order and in the proper slots as determined by the correct spindle speeds for the different operative steps in the cycle to form a production log, and from thence on can proceed by merely locating the line adjacent the number blocks in line with the line 66c on the housing and observing the location of the blocks indicating the speed range of the motor.

Although in all of the forms previously described the indicating device has been operatively associated with the preselecting mechanism, it will be readily appreciated that such a device is susceptible of advantageous use, wherein it is not operatively associated with any speed changing mechanism, but is manually and separately operated.

Reference to Figs. 20 and 21 will now be had, wherein there is illustrated an indicating device constituting an independent unit which can be mounted on the head stock or other suitable part of the machine without an operative connection to the gear changing or selecting mechanism, and so arranged as to be manually operated. The indicating device shown in Figs. 20 and 21 is substantially identical with that shown in Figs. 12 to 19 inclusive, it being noted that a base 73 is shown secured to the upper side of the cover 29c of the head stock and has a centrally arranged upwardly extending bearing boss 73a to one side of which is a bearing extension 73b which rotatably supports a horizontally extending shaft 74 having an operating knob 74a on its outer end and a bevel pinion 74b fixed to its inner end. The bevel pinion 74b meshes with a bevel gear 75a formed on the lower end of the hub 75b of the rotatable drum 75 which corresponds to the drum 65 previously described. The hub 75b of the drum fits upon and is secured to the shaft 76 which has its lower end supported in the bearing box 73a and its upper end in the bearing boss 77a of the stationary housing 77. The housing 77 is provided at its lower end with a slot through which the shaft 74 projects. The housing 77 is also provided with a window opening 77b corresponding to the window opening 66b previously referred to, wherefore it will be seen that when the knob 74a is turned the drum 75 is rotated within the housing 77 and the indicia on the periphery of the drum and representing the cutting speeds in feet per minute for various diameters of work and the work spindle speeds in R. P. M. obtainable in the particular machine upon which the device is mounted become visible through the window opening 77b similarly as has been previously described in connection with the indicating device shown in Fig. 12. Above the housing 77 a cup-shaped member 78 similar to the cup-shaped member 67 previously described is keyed to the reduced end of the shaft 76 and is provided with slots, number blocks and lines exactly corresponding to the slots, number blocks and lines previously described in connection with the indicating device shown in Fig. 12. The drum in this instance can be rotated in the same or opposite directions.

When the indicating device shown in Figs. 20 and 21 is employed the operator will determine from the known cutting speeds in feet per minute for the tool and type of cut and known diameter of the work the correct spindle speeds in R. P. M. and will then shift the necessary levers or other devices to obtain the said spindle speeds. The operator during each operative step in the complete cycle can determine the correct spindle speed for the next step, and in the case of continued production upon work pieces of the same kind will position the number blocks in the slots of the member 78, corresponding to the determined spindle speeds so that he can perform the various speed changes for the different operative steps in the correct sequence by reference to the positions of the number blocks and the associated spindle speeds appearing in the window.

It will be understood that the invention contemplates an indicating device employing relative slidable or rockable indicia carrying members as well as the relatively rotatable members illustrated.

From the foregoing description it will be seen that the employment, in connection with a machine tool of an indicating device embodying the present invention enables the operator to efficiently and quickly determine the correct spindle speeds for the different operative steps, since he knows the maximum cutting speeds in feet per minute to be used for a given tool, diameter of work and type of cut, by merely bringing the number representing the maximum cutting speed in line with the known diameter of the work piece, which acts automatically to bring into view the number representing the proper spindle speed and in the first two forms of the invention illustrated and described further acts automatically to preselect the proper spindle speed, but in the third form he will subsequently change to the speed indicated. The indicating devices embodying the present invention are also susceptible of extremely advantageous use in connection with large production work, since the disks or number blocks bearing numbers corresponding to the different operative steps of the complete work cycle can be positioned once the proper spindle speeds have been determined for the said steps to form a production log, and thereafter the operator merely needs to refer in the first two forms to the numbers representing the operative steps of the cycle and in the third form to said numbers and the spindle speeds associated therewith. The indicating devices embodying the present invention possess the further advantage that the operator can readily select the proper spindle speeds for work pieces of varying degrees of hardness, as it is so often necessary to do and may quickly obtain these correct spindle speeds by registering a cutting speed in feet per minute lower than the maximum cutting speed in line with the known diameter of the work piece, wherefore he will obtain the correct spindle speed for the lower cutting speed. It will also be remembered that the selection of the proper spindle speeds is facilitated by the employment of the variously colored zones on the drum indicating different ranges of cutting speeds.

Although several embodiments of the invention have been illustrated and described herein, it should be understood that the invention is susceptible of various modifications and adaptations within the scope of the appended claims.

Having thus described my invention, I claim:

1. An indicator for use with a machine tool and comprising relatively movable members having provision for determining the rates of movement of a movable part of the machine tool in relation to cutting speeds for different diameters of work, and means relatively movable with respect to one of said members and actuated by the relative movement of said members for indicating the sequential operative steps of a work cycle.

2. In combination with a machine tool having a movable part whose rate of movement is to be controlled, and means for preselecting during one operative step of a work cycle the rate of movement of said part for the next operative step of the cycle, an indicating device operatively associated with said means and comprising relatively movable members having provision for determining the rates of movement to be preselected for said movable part in relation to cutting speeds for different diameters of work.

3. In combination with a machine tool having a movable part whose rate of movement is to be controlled, and means for preselecting during one operative step of a work cycle the rate of movement of said part for the next operative step, an indicating device operatively associated with said means and comprising relatively movable members having provision for determining the rates of movement to be preselected for said part in relation to cutting speeds for different diameters of work, and means relatively movable with respect to one of said members for indicating the sequential operative steps of a work cycle.

4. An indicating device adapted to be applied to a machine tool including a movable member having a tool or work piece operatively associated therewith and control mechanism for said member; said indicating device being operatively associated with said mechanism and having means for indicating substantially the cutting speed for different diameters of work and means for indicating the sequential operative steps of a work cycle, said means being operatively interconnected.

5. An indicating device adapted to be applied to a machine tool including a movable member having a tool or work piece operatively associated therewith and control mechanism for varying the rate of movement of said member; said indicating device being operatively associated with said mechanism and having means whereby the correct rate of movement of said member can be visually determined from the cutting speed in feet per minute for different diameters of work, and means for indicating the sequential operative steps of a work cycle corelated to the determined rates of movement of said member.

6. An indicating device adapted to be applied to a machine tool including a movable member having a tool or a work piece operatively associated therewith and control mechanism for varying the rate of movement of said member; said indicating device being operatively associated with said mechanism and having means for visually indicating the different rates of movement of said member in relationship to cutting speeds for different diameters of work, and means for indicating the sequential operative steps of a work cycle.

7. An indicating device adapted to be applied to a machine tool including a movable member having a tool or work piece operatively associated therewith and control mechanism for said member; said indicating device having means for indicating substantially the cutting speed for different diameters of work in relation to the rate of movement of said member and means for indicating the sequential operative steps of a work cycle, both of said means being operatively associated with said mechanism.

8. An indicating device adapted to be applied to a machine tool including a movable member having a tool or a work piece operatively associated therewith and control mechanism for preselecting during one operative step of a work cycle the rate of movement of said member for the next operative step; said indicating device being operatively associated with said mechanism and having means for indicating substantially the cutting speed for different diameters of work in relation to the rates of movement preselected for said member.

9. An indicating device adapted to be applied to a machine tool including a movable member having a tool or a work piece operatively associated therewith and control mechanism for preselecting during one operative step of a work cycle the rate of movement of said member in the next operative step; said indicating device being operatively associated with said mechanism and having means for indicating the correct rate of movement of said member for a certain cutting speed in feet per minute for the type of cut and for different diameters of work.

10. An indicating device adapted to be applied to a machine tool having two movable members one of which has associated therewith a tool and the other the work piece, one of said members being movable relative to the other at varying rates of movement, control mechanism for changing the rates of movement of said last member; said indicating device being operatively associated with said control mechanism and having means for indicating the correct rate of movement of said last member in relation to the cutting speed of the tool for different diameters of work and for indicating the sequential operative steps of a work cycle in relation to said rates of movement.

11. An indicating device adapted to be applied to a machine tool having two movable members, one of which has a tool associated therewith and the other the work piece, one of said members being movable relative to the other at varying rates of movement, and control mechanism for preselecting during one operative step in the work cycle the rate of movement of said last member for the next operative step; said indicating device being operatively associated with said control mechanism and having means for indicating the correct rates of movement to be preselected for said last member in relation to the cutting speed of the tool for different diameters of work.

12. An indicating device adapted to be applied to a machine tool having two movable members, one of which has a tool associated therewith and the other the work piece, one of said members being movable relative to the other at varying rates of movement, control mechanism for preselecting during one operative step of the work cycle the rate of movement of said member for the next operative step; said indicating device being operatively associated with said control mechanism and having means for indicating the correct rates of movement to be preselected for said member in relation to the cutting speed of the tool for different diameters of work, and means for indicating the sequential operative steps of a work cycle in relation to the rates of movement to be preselected.

13. An indicating device for use with a machine tool and comprising means for indicating the rates of movement of a movable part of the machine tool in relation to cutting speeds for varying types of cuts and for different diameters of work, and means for indicating the sequential operative steps of a complete work cycle for the machine tool in relation to the rate of movement of said part to be used in each of said steps.

14. An indicating device for use with a machine tool and comprising means for determining the different rates of movement of a movabe part of the machine tool in relation to cutting speeds for different types of cuts and for different diameters of work, and adjustable means for indicating the sequential operative steps of a work cycle and corelated with respect to the determined rates of movement of said movable part whereby said device forms a production log.

15. An indicating device for use with a machine tool and comprising means for determining the correct rates of movement of a movable part of the machine tool for cutting speeds for different diameters of work and including various color bands representing different ranges of cutting speeds.

16. An indicating device for use with a machine tool and comprising a movable member provided with zones of different color representing different ranges of cutting speeds for different diameters of work and with indicia representing rates of movement of a movable part of the machine tool corelated to said colored zones.

17. An indicating device for use with a machine tool and comprising a movable member having thereon variously colored zones indicating different ranges of cutting speeds and indicia representing rates of movement of a movable part of the machine and corelated with respect to said colored zones, and a stationary member cooperating with said movable member and bearing indicia representing different diameters of work which cooperate with said colored zones on the movable member.

18. In combination with a machine tool having a spindle adapted to be rotated at different speeds, means for preselecting during one operative step in a work cycle the spindle speed for the next operative step, an indicating device operatively associated with said preselecting means and comprising a movable member and a stationary member having cooperating indicia indicating the correct spindle speed to be preselected in relationship to cutting speeds for different diameters of work.

19. In combination, a machine tool having a spindle rotatable at different speeds, means for preselecting during one operative step in a work cycle the speed for said spindle in the next operative step, and an indicating device having an operative connection with said preselecting means and including a stationary member and a movable member having cooperating indicia indicating the cutting speed for different diameters of work in relation to the spindle speeds, and adjustable means operatively associated with said movable member and bearing indicia cooperating with a pointer on said stationary member and sequentially indicating the different operative steps of the work cycle in relation to the spindle speed to be preselected for each step.

20. An indicator for use with a machine tool and comprising a stationary member and two movable members, one of which is provided with means cooperating with means on the stationary member for determining the different rates of movement of a movable part of the machine tool in relation to cutting speeds for different types of cuts and for different diameters of work and the other of said movable members being provided with means indicating the sequential operative steps of a work cycle and corelated with respect to the determined rates of movement of said movable part of the machine, and means for moving said movable members in timed relation with respect to each other.

21. An indicator for use with a machine tool and comprising a stationary member and two movable members, one of said movable members being provided with means cooperating with means on the stationary member for determining the different rates of movement of a movable part of the machine tool in relation to cutting speeds for varying types of cuts and for different diameters of work and the other of said movable members being provided with means for indicating the sequential operative steps of a complete work cycle and corelated with respect to the determined rates of movement of said movable part, and a common means for moving said movable members.

22. An indicator for use with a machine tool and comprising a stationary member and a plurality of movable members, one of said movable members being provided with means cooperating with means on the stationary member for determining the different rates of movement of a movable part of the machine tool in relation to cutting speeds for different diameters of work, another of said movable members including indicia representing sequential operative steps of a work cycle and adjustable so as to be corelated with respect to the determined rates of movement of said movable part, and means for moving said movable members.

23. An indicating device for use with a machine tool and comprising a stationary housing, a rotatable shaft extending through and beyond one end of said housing, a drum mounted on said shaft within said housing and bearing indicia cooperating with means on said housing for determining the different rates of movement of a movable part of the machine tool in relation to cutting speeds for different diameters of work, and a member mounted on said shaft exteriorly of said housing and provided with means for indicating the sequential operative steps of a work cycle and corelated with respect to the determined rates of movement of said movable part.

24. An indicating device for use with a machine tool and comprising a stationary housing, a rotatable shaft extending through and beyond one end of said housing, a drum mounted on said shaft within said housing and bearing indicia cooperating with means on said housing for determining the different rates of movement of a movable part of the machine tool in relation to cutting speeds for different diameters of work, means for rotating said shaft from exteriorly of the housing, and adjustable means indicating the sequential operative steps of a complete work cycle.

25. An indicating device for use with a machine tool and comprising a housing, a drum within said housing and rotatable relative thereto and provided with means cooperating with means on said housing for indicating the rates of movement of a movable part of the machine tool in relation to cutting speeds for different diameters of work, rotatable means exteriorly of said housing and provided with means for indicating the sequential operative steps of a complete work cycle, and means for rotating said rotatable means in timed relation to the relative rotation of said drum and said housing.

26. An indicator for a machine tool and comprising a housing and a member within said housing and relatively movable with respect thereto, said housing and said member being provided with cooperating means for determining the rates of movement of a movable part of the machine tool in relation to cutting speeds for different diameters of work, a movable member arranged exteriorly of said housing and provided with means for indicating the sequential operative steps of a work cycle, and means for effecting relative movement between said housing and said first mentioned member and for effecting movement of said second mentioned member in timed relation with said relative movement of the housing and said first member.

27. An indicator for use with a machine tool comprising a housing, a member within said housing and movable relative thereto, said housing and said member being provided with cooperating means for determining the different rates of movement of a movable part of the machine in relation to cutting speeds for different diameters of work, and a plurality of relatively adjustable disks arranged exteriorly of said housing and each provided with a different number representing the sequential operative steps of a work cycle and adapted to cooperate with a pointer on said housing, said disks and said housing being relatively movable.

28. An indicating device for use with a machine tool and comprising relatively movable members having provision for indicating the rates of movement of a movable part of the machine in relation to cutting speeds for different diameters of work and a member for indicating the sequential operative steps of a work cycle and relatively movable with respect to one of said first mentioned members and including a plurality of predeterminedly arranged openings and number bearing devices selectively positioned in said openings.

29. In combination in a machine tool having a rotatable spindle mounted in the head thereof and means for rotating said spindle at different speeds, means for preselecting during one operative step of the work cycle the spindle speed for the next operative step and including a rotating shaft having preselecting spools arranged thereon for rotation therewith and movement endwise thereof, an indicating device for indicating the spindle speeds to be preselected in relation to cutting speeds for different diameters of work and comprising relatively movable members, and means operatively connecting one of said movable members of said indicating device with said shaft.

30. In a machine tool having a rotatable spindle, means for varying the rate of rotation of said spindle, means for preselecting during one operative step of the work cycle the rate of rotation of said spindle in the next operative step and including a rotatable shaft having preselecting spools mounted thereon for rotation therewith and movement endwise thereof, an indicating device comprising relatively movable members having means including indicia representing cutting speeds in feet per minute for different diameters of work and corelated to various spindle speeds, an opertive connection between said shaft and one of said relatively movable members, and means for rotating said shaft to turn said preselecting spools and said relatively movable members to determine from the indicating device and the known cutting speed of the tool and diameter of the work the correct spindle speed to be preselected.

31. A machine tool comprising a spindle rotatable at different speeds, means for varying the speed of said spindle, means for preselecting during one operative step of the work cycle the speed of said spindle for the next operative step and including a rotatable shaft having preselecting spools splined thereto to rotate therewith for movement endwise thereof, an indicating device comprising relatively rotatable indicia carrying members for determining the spindle speed to be preselected from the known cutting speed of the tool and diameter of the work, and a geared operative connection between said shaft and said device whereby the relative movement of said indicia carrying members is in timed relation to the rotation of said shaft and spools.

32. A machine tool comprising a spindle rotatable at different speeds, means for varying the speed of said spindle, means for preselecting during one operative step of the work cycle the speed of said spindle for the next operative step and including a rotatable shaft having preselecting spools splined thereto to rotate therewith for movement endwise thereof, an indicating device comprising relatively rotatable indicia carrying members for determining the spindle speed to be preselected from the known cutting speed of the tool and diameter of the work, an operative connection between said indicating device and said shaft and including a cable and pulleys whereby the relative rotation of said indicia carrying members is in timed relation to the rotation of said shaft.

33. In a machine tool having a rotatable spindle, means for changing the speed of said spindle and means for preselecting during one operative step of the work cycle the spindle speed for the next operative step and including a rotatable shaft having preselecting spools splined thereto to rotate therewith and move endwise thereon, an indicating device comprising a shaft having an operative connection with said first named shaft, a stationary member surrounding said second shaft, a drum mounted on said shaft and having indicia cooperating with indicia on said stationary member for indicating the correct spindle speeds to be preselected in relationship to cutting speeds for different diameters of work, and adjustable means operatively connected to said shaft for indicating the sequential operative steps of the work cycle in relation to the spindle speeds to be preselected.

34. An indicating device for use with a machine tool having a part adapted to be moved at different rates of movement and means for varying the rates of movement of said part and adapted to be operated at either one of two speed ranges, said indicating device comprising cooperating members one of which is provided with indicia indicating cutting speeds in feet per minute for different diameters of work in relationship to rates of movement of the movable part and arranged in columns corelated to the two speed ranges, and means associated with said members for visually indicating which of the two speed ranges is to be employed.

35. An indicating device for use with a machine tool having a part to be moved at different rates of movement and means for varying the rates of movement of said part and adapted to be operated at either one of two speed ranges, said indicating device comprising relatively movable members provided with cooperating indicia certain of which are arranged in two columns and disclose cutting speeds in feet per minute for different diameters of work in relation to the rates of movement of said part and corelated to the two speed ranges, said relatively movable members also being provided with cooperating means to indicate which one of the two speed ranges is to be employed and including slots corresponding to said columns, and blocks arranged in said slots and indicating which of the speed ranges is to be employed in the successive operative steps of the complete work cycle.

36. An indicating device for use with a machine tool having a movable part and means for varying the rate of movement of said part, said indicating device comprising relatively movable members provided with cooperating means for indicating cutting speeds for different diameters of work in relation to the rates of movement of said movable part and with means for indicating the successive operative steps in the complete work cycle, said last means including elongated slots and removable blocks associated therewith and bearing indicia indicating the different operative steps of a complete work cycle, said slots being so proportioned with respect to said blocks that a plurality of the latter can be positioned in any one of the slots in case several operative steps in the cycle require the same rate of movement of said movable part.

37. An indicating device for use with a machine tool having a movable part and means for varying the rate of movement of said part, said device comprising relatively movable members certain of which carry indicia, said members including a pulley and a rotatable indicia carrying member, and means providing an adjustable operative connection between said rotatable member and said pulley to enable said rotatable member to be properly positioned with respect to a cooperating indicia bearing member.

38. An indicating device for use with a machine tool comprising means for determining the correct rates of movement of a movable part of the machine tool for cutting speeds for different diameters of work and including various color bands representing different ranges of cutting speeds, and means for indicating the sequential operative steps of a complete work cycle for the machine tool.

39. An indicating device adapted to be applied to a machine tool including a movable member having a tool or a work piece operatively associated therewith, and control mechanism for preselecting during one operative step in the work cycle the rate of movement of said member in the next operative step and for obtaining the preselected rates; said indicating device being operatively associated with said mechanism and comprising means for indicating the cutting speed for different diameters of work in relation to the rates of movement preselected and including various color bands representing different ranges of cutting speeds.

40. An indicating device adapted to be applied to a machine tool including a movable member having a tool or a work piece operatively associated therewith, and control mechanism for preselecting during one operative step in the work cycle the rate of movement of said member in the next operative step and for obtaining the preselected rates; said indicating device being operatively associated with said mechanism and comprising means for indicating the cutting speed for different diameters of work in relation to the rates of movement preselected and including various color bands representing different ranges of cutting speeds, and means for indicating the sequential operative steps of a complete work cycle.

41. In combination with a machine tool having a part to be moved at different rates, change speed means for moving said part at said different rates, and an indicating device operatively associated with said change speed means and provided with means for indicating the different sequential operative steps in a complete work cycle.

42. In combination with a machine tool having a part to be moved at different rates, change speed means for moving said part at said different rates, and mechanism for preselecting during one operative step of a complete work cycle the rate of movement of said part during the following operative step of the cycle, and an indicating device operatively associated with said mechanism and including means for indicating the different sequential operative steps in the complete work cycle.

43. In a change speed driving mechanism for a spindle including a speed control member for said mechanism, a device associated with said control member for setting said control member for different speeds and for designating the particular spindle speed for which said control member is set, the combination of changeable symbols for designating a desired sequence of spindle speeds, an index mark, and operative connections with said device producing relative movement as between said symbols and said index mark, whereby a plurality of such spindle speeds may be obtained in any desired predetermined sequence, and the particular stage in such sequence is indicated when the device is set at such sequence symbol.

44. In a machine tool having a part movable at different rates of movement for the different operative steps of a complete work cycle, means for selecting the rates of movement for said part, means operatively connected with said selecting means and including a member sequentially indicating with reference to the different operative steps the different rates of movement to be selected for said part, wherefore when said last named means is actuated to indicate a certain operative step said selecting means is simultaneously actuated to select the proper rate of movement of said part for said operative step.

45. In a machine tool the combination of a movable support, transmission mechanism for said support including a rate changer adjustable to various speed positions, speed selector means including a member adjustable to various positions respectively indicating the different rate changer positions and connections operative between said member and rate changer to effect the indicated rate changer position, and other selector means including a series of sequence indicating symbols and a pointer relatively movable in accordance with the movement of said speed selector member.

MAX E. LANGE.